M. P. WETMORE.
WELDING APPARATUS.
APPLICATION FILED APR. 29, 1920.
1,361,652.
Patented Dec. 7, 1920.
5 SHEETS—SHEET 1.
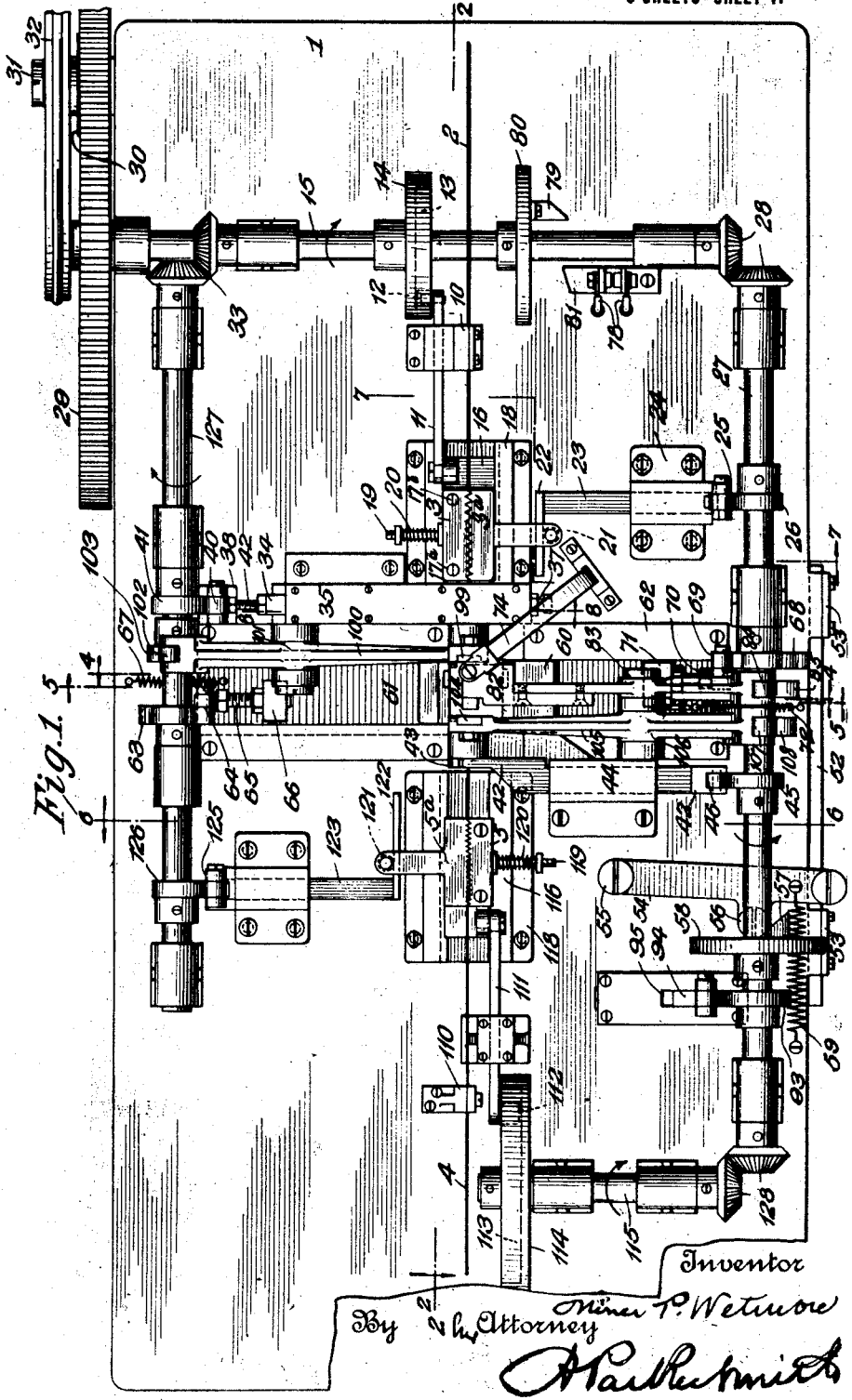
Inventor
Miner P. Wetmore
By his Attorney

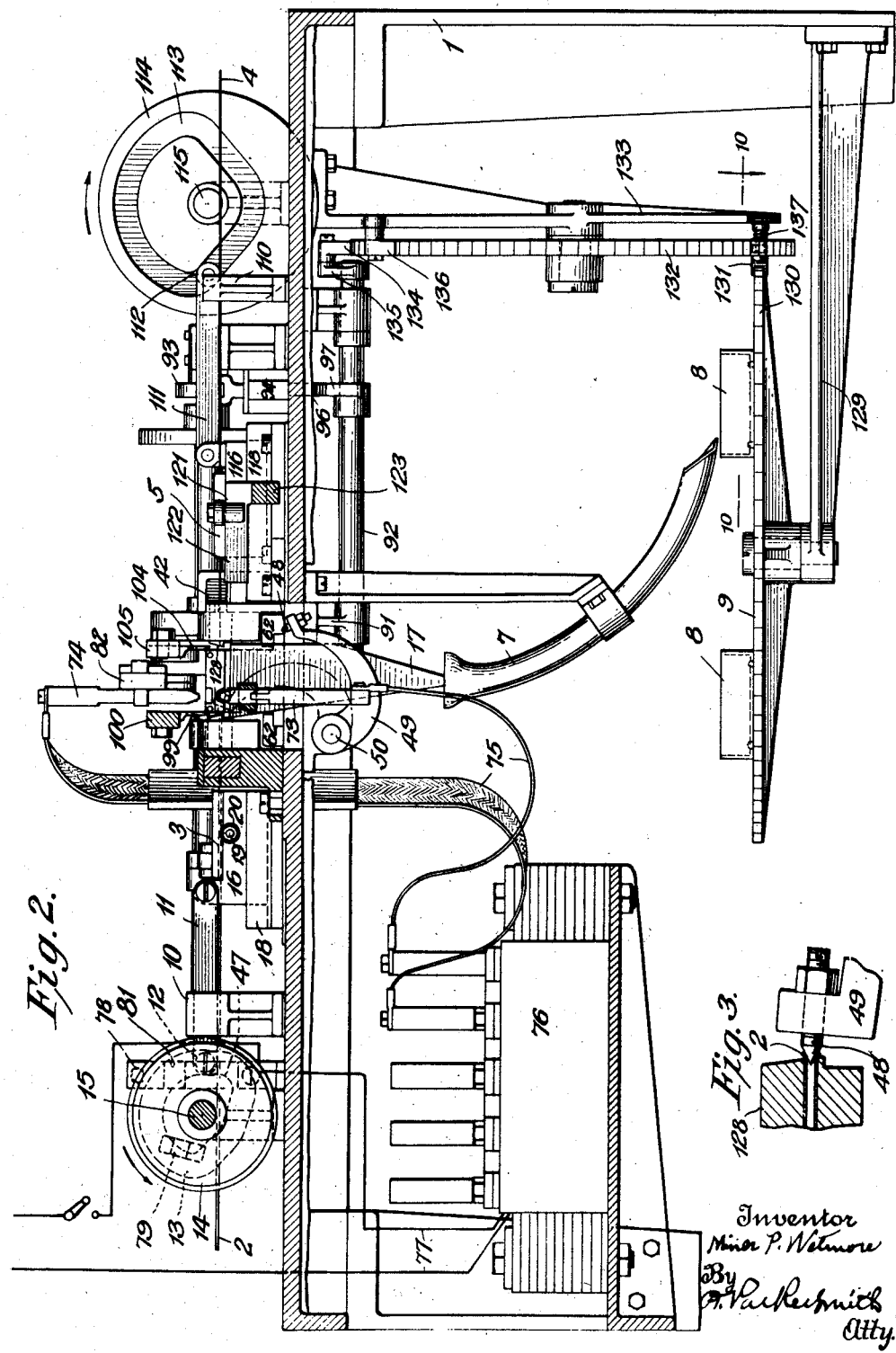

M. P. WETMORE.
WELDING APPARATUS.
APPLICATION FILED APR. 29, 1920.
1,361,652.
Patented Dec. 7, 1920.
5 SHEETS—SHEET 3.
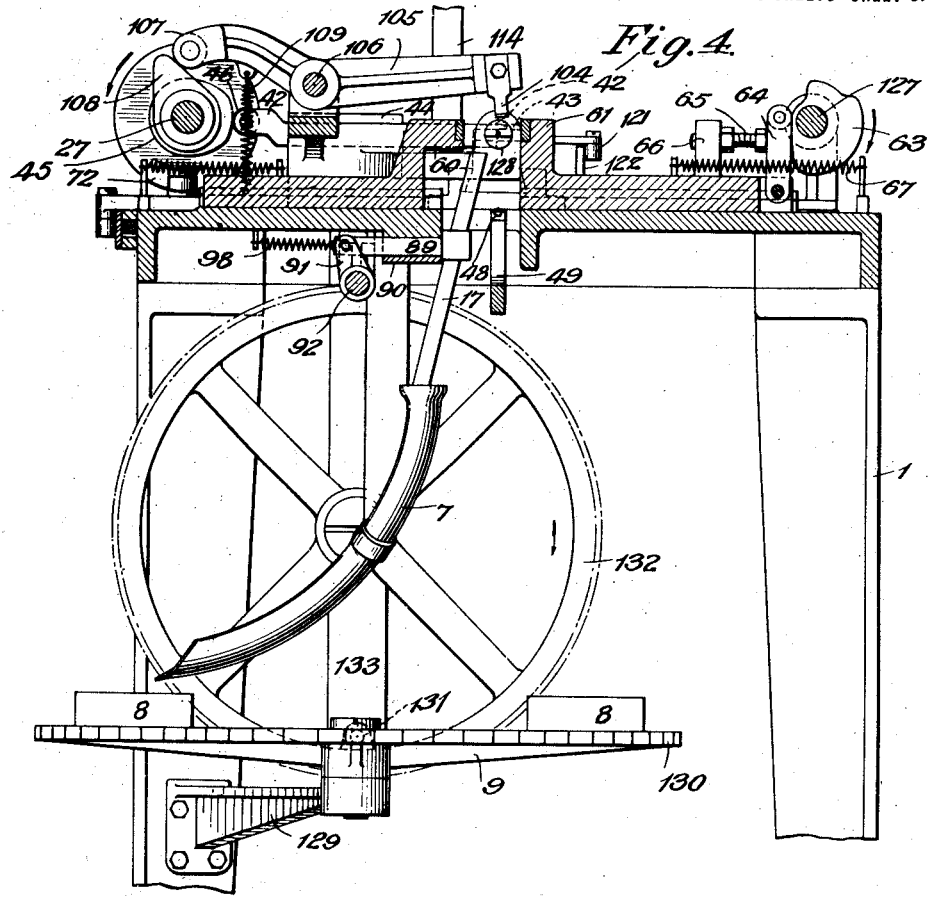
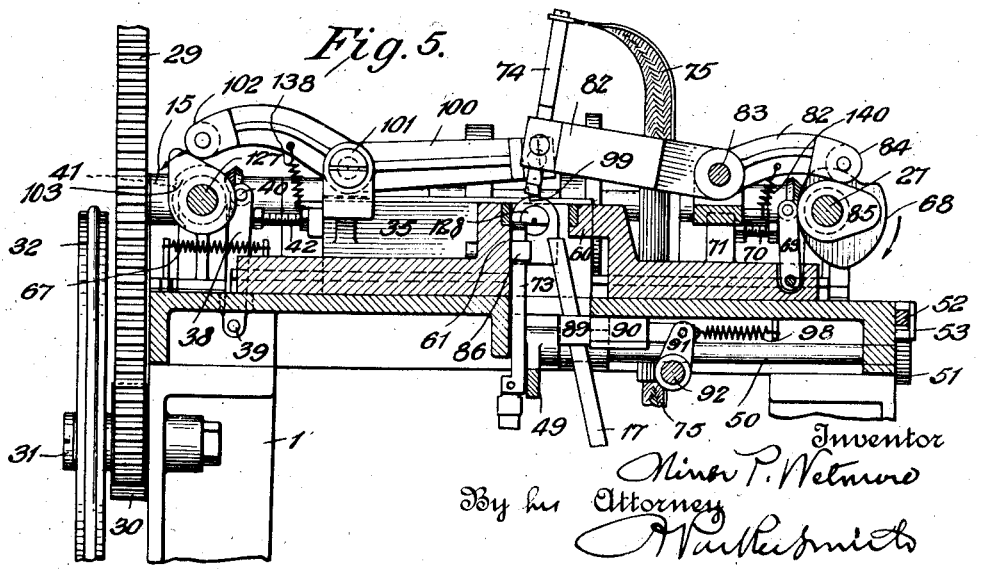

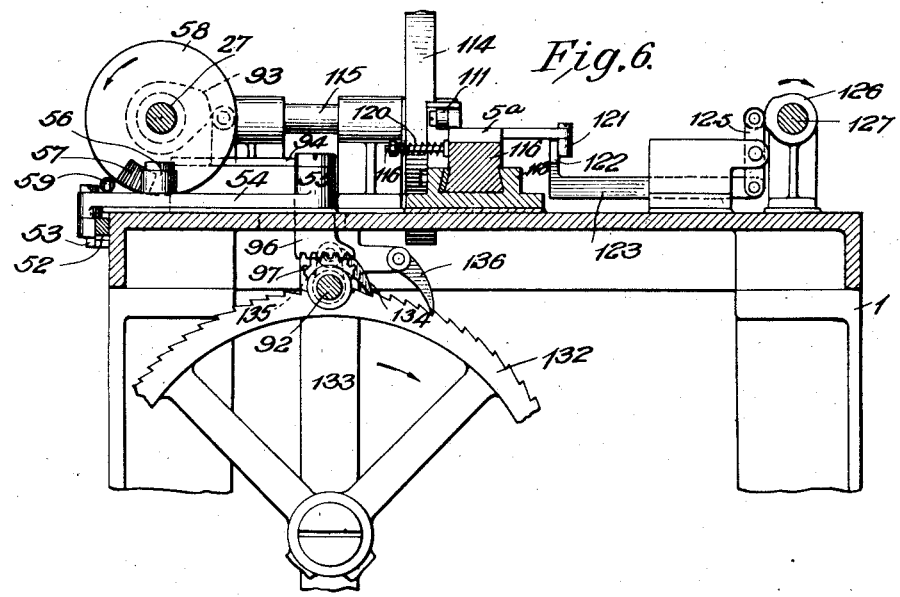

M. P. WETMORE.
WELDING APPARATUS.
APPLICATION FILED APR. 29, 1920.
1,361,652.
Patented Dec. 7, 1920.
5 SHEETS—SHEET 5.
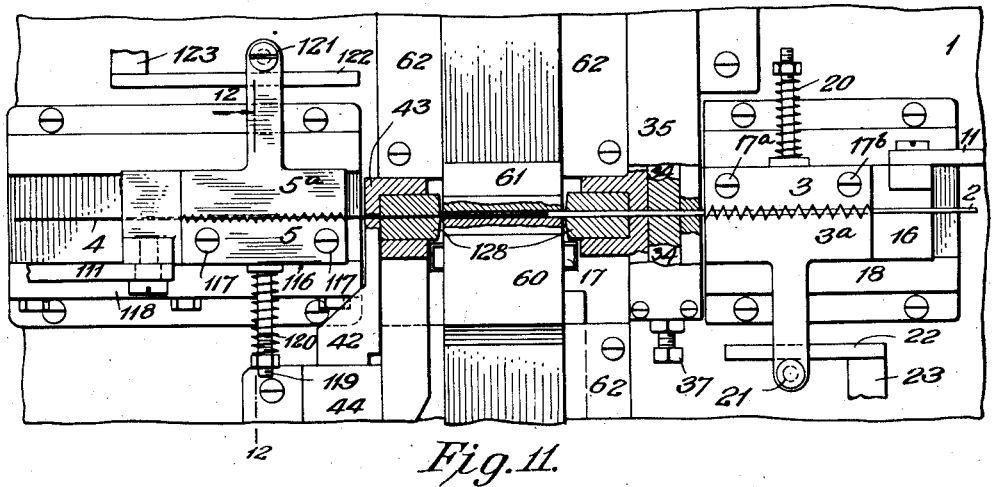
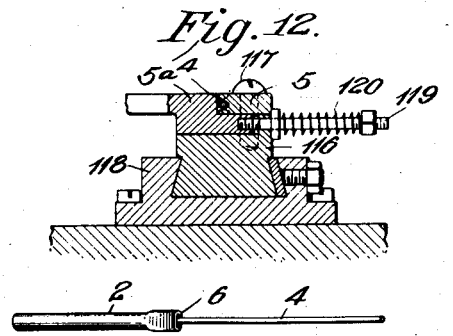
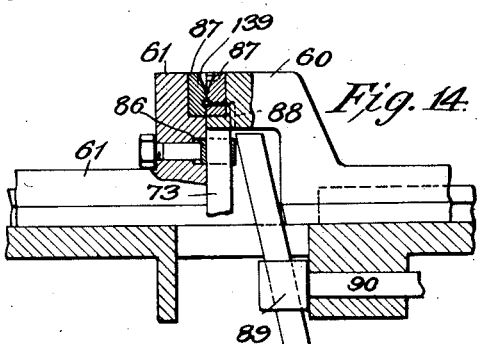
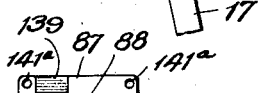
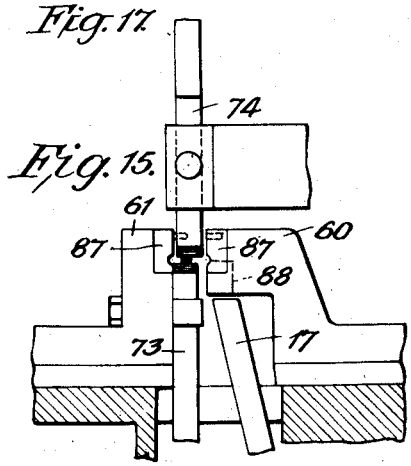
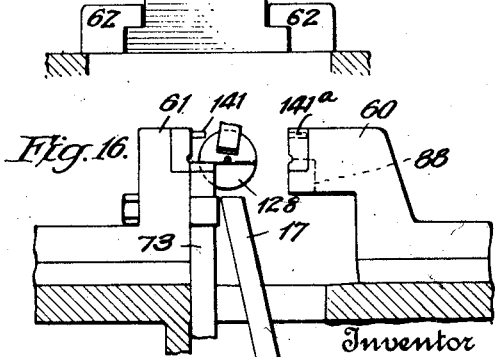

UNITED STATES PATENT OFFICE.

MINER P. WETMORE, OF NEWARK, NEW JERSEY, ASSIGNOR TO HYGRADE ENGINEERING CO. INC., A CORPORATION OF NEW JERSEY.

WELDING APPARATUS.

1,361,652.           Specification of Letters Patent.      Patented Dec. 7, 1920.

Application filed April 29, 1920. Serial No. 377,487.

*To all whom it may concern:*

Be it known that I, MINER P. WETMORE, a citizen of the United States of America, residing at Newark, county of Essex, State of New Jersey, have invented certain new and useful Improvements in Welding Apparatus, of which the following is a specification.

My invention relates to apparatus for joining together by means of a welded joint pieces of small tubing and short sections of wire inserted therein, such as are used for supporting the filaments of incandescent electric lamps. The best form of apparatus embodying my invention at present known to me is illustrated in the accompanying five sheets of drawings in which—

Figure 1, is a plan view of the apparatus with parts broken away.

Fig. 2, is a vertical longitudinal section on line 2—2 of Fig. 1, looking in the direction indicated by the arrows.

Fig. 3, is an enlarged detail, partly in section, of the apparatus for flaring out the end of the tube.

Fig. 4, is a vertical cross section on line 4—4, of Fig. 1, looking in the direction indicated by the arrows; parts being broken away.

Fig. 5, is a cross section on line 5—5 of Fig. 1, looking in the opposite direction as indicated by the arrows, parts being broken away.

Fig. 6, is another cross section on line 6—6, of Fig. 1, looking in the direction indicated by the arrows and with parts broken away.

Fig. 7, is a detail cross section on the broken line 7—7, of Fig. 1, looking in the direction indicated by the arrows.

Fig. 8 is a similar detail cross section taken on the line 8—8 of Fig. 1, on an enlarged scale.

Fig. 9 is a detail view of the rack and pinion for operating the tube flaring tool shown in Fig. 3.

Fig. 10 is a detail plan view, with parts broken away, of the rotating receptacle for the finished product of the machine, parts being shown in section on line 10—10 of Fig. 2.

Fig. 11 is an enlarged detail plan view of the wire and tube feeding devices, upon an enlarged scale, parts being shown in section.

Fig. 12 is a detail cross section on line 12—12 of Fig. 11, on a vertical plane.

Figs. 13, 14, 15 and 16 show details of the welding apparatus in various positions, and Fig. 17 is a perspective view of the finished product of the machine. Throughout the drawings like reference characters indicate like parts.

1, is the main frame and table forming a bed for the machine. The flexible tubing 2, is fed over this table longitudinally thereof, from right to left (looking at Fig. 1) by reciprocating feed jaws, 3, 3ª. The wire 4, is fed over the table in the opposite direction by reciprocating feed jaws 5, 5ª. The end of wire 4, is inserted part way into the end of tubing 2, by action of these two sets of feeding apparatus, and the overlapping portion of the tube is pinched down on the wire and electrically welded thereto to form the joint shown in Fig. 17. The connected portions of the wire and tubing are cut off and the completed article shown in Fig. 17 then drops down through chutes 17 and 7, into one of the receptacles 8, on rotating table 9. The mechanism may be divided into groups for convenient description, as follows:

Tube feeding mechanism.

The tubing 2, passes first through the stationary guide 10, which also serves as a guide or bearing for the longitudinally reciprocating rod 11, one end of which carries the cam roller 12, engaging the cam groove 13, in disk cam 14. The cam disk is fast on rotating shaft 15, journaled in bearings on bed 2. The other end of rod 11, is bolted to slide 16, carrying the feed jaws 3, 3ª. The jaw 3, is fastened to slide 16, by screws 17, 17. The other jaw 3ª, slides toward and from the rigid jaw 3, being guided by spindle 19, on which it is mounted, but it is normally forced toward said jaw 3, by spring 20. These jaws have serrated faces as shown, and the ends of the teeth so formed are grooved in line one with another so that the tubing 2, is confined in said groove as shown in Fig. 12, and will be still loosely confined therein even if the jaws are partly separated so as to release their grip on the tube. The jaw 3ª, is intermittently pulled away from fixed jaw 3, by its roller 21, being engaged by movable bar 22, carried on one end of slide 23, which slide is mounted in guide 24, and has its other end pivoted to one end of cam lever 25, fulcrumed to guide 24. The other end of lever 25, engages cam 26, on shaft 27. Shafts 15, and 27, are connected by bevel gearing 28, so as to rotate synchronously. Shaft 15, is rotated by gear 29, meshing with pinion 30, keyed to stub shaft 31, which carries grooved belt pulley 32. Cam disk 14, and cam 26, are so timed that when jaws 3, 3ª, are drawn back (toward the right, looking at Fig. 1) bar 22, is pulled away from jaw 3, by cam 26, and as the roller 21, rides on this bar, it pulls jaw 3ª, away from fixed jaw 3, far enough to allow the jaws to slip over the tubing 2.

The tubing 2, is held fast at its front end, while the jaws 3, 3ª, are sliding backward over it, by means of grippers 34, 34, (see Fig. 8), which are loosely mounted in guide box 35, and normally forced slightly apart by small springs 36, 36. The shorter gripper 34, is adjusted in position by set screw 37, and remains stationary. The longer gripper is moved to the left (looking at Fig. 8) by springs 36, 36, except when it is thrown to the right by cam lever 38, pressed by cam 41, on shaft 127, against adjustable bearing screw 42, mounted in the gripper. Cam lever 38, is fulcrumed to the bed 1, at 39, and carries roller 40, at its upper end coöperating with cam 41. This latter is so timed with reference to cam disk 14, that grippers 34, 34, seize the end of the tube between them while feed jaws 3, 3ª, are being withdrawn, but springs 36, 36 are allowed to spread the grippers apart slightly while the tubing is being advanced by the jaws 3, 3ª. During such forward movement of jaws 3, 3ª (from right to left, looking at Fig. 1). cam 26, has allowed spring 20, to pull the jaws together so that they will grip the tubing 2, with sufficient force to carry it along with the jaws, and feed it forward a predetermined amount. Cam 41 may have two full faced sections as shown in Fig. 5, which are so timed that grippers 34, 34, may hold the tubing, for an instant, (for a purpose described later) after its forward movement has begun.

*Wire feeding mechanism.*

This is practically a duplicate of the tube feeding mechanism. The wire 4, is drawn forward (from left to right, looking at Fig. 1) by serrated jaws 5, 5ª, through guide 110, being reciprocated by rod 111, carrying cam roller 112, engaging cam groove 113, in cam disk 114, on shaft 115, which is driven through bevel gears 128, from shaft 127. Fixed jaw 5, is rigid on slide 116, which moves in guides 118, under control of rod 111. During forward movement (to the right, looking at Fig. 1) jaws 5, 5ª, grip the wire under action of spring 120, on spindle 119, and pull the wire 4, through guide 110. On the return movement of jaws 5, 5ª, they release the wire, the bar 122, on which roller 121, rides, being moved away from the fixed jaw 5, by motion of slide 123, given by cam 126, acting on lever 125. Cam 126, is mounted on shaft 127, driven by bevel gear 33, from main shaft 15.

During backward motion of the jaws 5, 5ª, wire 4, is held by plunger 42, which grips it against stationary jaw 43, (see Figs. 1, 4 and 11). Plunger 42, slides in guide box 44, and is operated by cam 45, on shaft 27, coöperating with cam roller 46, on the rear end of the plunger (see Fig. 4).

The feeding of the wire is done in one movement, there being no necessity for an interrupted, or two-step movement such as is given the tubing.

*Tube flaring mechanism.*

Before feeding the wire and tubing toward each other far enough to insert the wire part way into the end of the tubing as indicated in Fig. 11, it is necessary to slightly flare the end of the tubing or, at least, to make sure that it is fully open and not left in a partially collapsed condition by a previous action of the cutting knife, so that the wire cannot enter it easily. To accomplish this the circular portion of cam groove 13, in cam disk 14, is preferably given a slightly projecting section 47, (see Fig. 2) near the end thereof which last engages the cam roller 12. This causes the tubing to halt for an instant after it has been fed forward a very little way, stopping in the position shown in Fig. 3. At this moment the grippers 34, 34, may again seize it, the second full faced portion of cam 41, coming into action to force grippers 34, 34 together again. The cone shaped spreader 48, carried by crank arm 49, is then swung up and enters the end of the tubing, giving it the slight flare shown in Fig. 3. The normal position of rest of crank arm 49, is shown in full lines in Fig. 2. Its operating position, shown in Fig. 3, is indicated by dotted lines in Fig. 2. It is swung up and down very quickly by partial rotation of shaft 50, by which it is carried. Shaft 50, is journaled in main frame 1, and has one end projecting through the side thereof and carrying pinion 51, meshing with rackbar 52, sliding in guides 53, 53. This rackbar is given a rapid, intermittent reciprocation by lever 54, connected to it at one end, fulcrumed at 55, at its other end, and carrying cam roller 56, coöperating with the steep, short cam 57, on disk 58, which is mounted on shaft 27. Spring 59, holds the cam roller against the cam. When the roller runs up the cam face 57, it suddenly kicks crank arm 49, up into the position shown in Fig. 3, and spreader 48 opens the end of the tubing. Then spring 59, pulls crank arm 49, back, as quickly, into the position shown in Fig. 2.

The entire sequence of operations on the tubing so far described, is as follows, beginning with the parts in the positions shown in Figs. 1, 2 and 6. The tubing is then about to be cut. After cutting, the grippers 34, 34, release the tubing and the feed jaws 3, 3ª, are advanced a trifle farther to the left (Figs. 1 and 6) by action of section 47, of cam groove 13. This advances the tubing to the position shown in Fig. 3. The flaring tool 48, then swings up and back, the grippers 34, 34, release the tubing and the jaws 3, 3ª, (which have been drawn back, after giving the above described slight advance movement to the tubing), are driven forward, feeding the tubing out between guide jaws 60, 61, which have closed in to form a guide for it. The grippers 34, 34, then again come into action and hold the tubing in that position during the welding and cutting operation. This completes the cycle.

Welding mechanism.

After the end of tube 2, has been opened and slightly flared as above described the wire and tubing are fed farther toward each other until the end of the wire is projected into the flared end of the tubing as indicated in Fig. 11, both being guided by the grooved guide-jaws 60, and 61, which at that moment are held together in the position indicated in Figs. 11 and 14. These jaws slide crosswise of the bed 1, in guides 62, 62. Jaw 61, is driven inwardly by cam 63 (see Fig. 4) fixed on shaft 127, operating on cam lever 64, which in turn presses against bearing bolt 65, set in lug 66, on the jaw 61. The jaw is retracted by spring 67. The jaw 60, is similarly reciprocated by the combined operation of cam 68, on shaft 27, (see Fig. 5), cam lever 69, bearing bolt 70, set in lug 71, and retracting spring 72. The purpose of separating jaws 60, and 61, is to allow the welding apparatus and flaring tool 48, to operate, and then, after the welded sections of wire and tubing have been cut off, to allow them to drop into the discharge chutes 17, and 7.

The welding apparatus consists of the lower, fixed electrode 73, the upper, swinging electrode 74, and their operating mechanism and electrical connections. The latter comprise the insulated ribbon-shaped conductors 75, the step-down transformer 76, and the alternating current supply circuit 77. In this supply circuit is included a pair of make-and-break spring contacts 78, (see Figs. 1, and 7) which are normally separated but may be forced into temporary contact once in each cycle of machine operations by wiper 79, on disk 80, which is pinned on shaft 15, striking the projection 81, on one of the spring contacts 78. At the moment primary circuit 77, is thus closed through the transformer the secondary circuit 75, is also closed by electrode 74, being forced downward toward the lower electrode 73, and the two nipping the tubing 2, between them, as shown in Fig. 15. The heat generated by the current then passing through the telescoped sections of tubing and wire for a moment softens the tubing so that it is flattened, by the pressure of the electrodes, down on the wire, and its flattened sides are welded to the wire, forming the joint shown in Fig. 17.

The electrode 74, is raised and lowered by rocking lever 82, in the end of which it is mounted. This lever is pivoted at 83, and is oscillated by cam roller 84, on its other end running over cam 85, on shaft 27. The stiff, ribbon-like portion of conductor 75, shown in Fig. 5, has elasticity enough to allow it to bend and spring 140 swings lever 82, in a clockwise direction (looking at Fig. 5), and so maintains cam roller 84, in constant engagement with cam 85. The working faces of the electrodes 73, 74 are kept clean and free from scale by the wiping action of the parts illustrated in Figs. 5, 14, 15 and 16.

The lower electrode 73, is supported by the horizontally sliding guide-jaw 61, to which it is held by ring-clamp 86. While the wire and tubing are being telescoped together, the guide-jaws and electrodes are in the position shown in Figs. 1, 11, and 14. The facing blocks 87, 87, are beveled off at 139, as shown in Fig. 14, to facilitate the introduction of the electrode 74, which descends as the jaws open (see Fig. 15). The face of jaw 60, has a V-shaped recess 88, to accommodate the wedge-shaped end of electrode 73. The continued opening movement of jaw 61, carries lower electrode 73, out from under the tubing, as shown in Fig. 16, there being a rubbing action of the electrodes on the tubing during this operation. When electrode 73, is moved completely from under tubing 2, the discharge chute 17, is moved under it by action of the sliding ring clamp 89, guided in lug 90, on the under side of bed 1, being forced to the left (looking at Fig. 5), by crank 91, to which it is pivoted. Crank 91, is fast on shaft 92, which is given a quick oscillation at this moment by cam 93, on shaft 27, moving slide 94, in slot 95, in bed 1, to the right (looking at Fig. 6), the rack 96, on slide 94, meshing with toothed sector 97, on shaft 92. Spring 98, pulls crank 91, back, maintaining the cam engagement, and retracting chute 17, into its normal position, shown in Figs. 4, 5, 14 and 15, after cam 93 has passed the anti-friction roller on slide 94.

The profiles of cams 63, and 68, are so shaped as to force jaws 60, and 61, together by one continuous motion but to separate the jaws by a two-step motion. When the jaws are together to form the guideway for the wire and tubing, the lower electrode 73, carried by jaw 61, is necessarily located to one side of the tubing, as shown in Fig. 14. The first, and half-way opening movement of the jaws brings this lower electrode into operative position, squarely under the tubing, as shown in Fig. 15, so that the welding operation may take place. It is thereafter necessary to move the electrode out from under the tubing so that the chute 17, may be moved under it. The second, or full opening movement of the jaws effects this. Finally, it is necessary to move the chute out of the way, (after the tubing, and wire have been cut off and fallen into it) so that the flaring tool 48, may swing up and open the cut end of the remaining tubing so as to render certain the telescoping into it of the cut end of the wire, at the next operation. Pins 141, on facing block 87, on jaw 61, cooperate with holes 141ª, in the block on jaw 60, to insure accurate registration.

*Packing mechanism.*

The filament supports composed of tube sections 2, and wire 4, shown in Fig. 17, constituting the finished product of the machine, are delivered by chute 7, into the series of boxes, 88, carried by rotating table 9 as shown in Fig. 10. In Figs. 2 and 4, some of these boxes are omitted for clearness. This table is pivoted on bracket 129, extending from main frame 1, and has as many ratchet teeth 130, on its circumference as there are boxes 8, on table 9. A spring pawl 131, carried by vertical ratchet wheel 132, journaled on bracket 133, engages one tooth 130, when it comes opposite bracket 133. Ratchet wheel 132 has, say a hundred teeth engaged successively by pawl 134, carried by crank 135, on oscillating shaft 92. A stationary pawl 136, prevents wheel 132, from turning backward. After pawl 131 has engaged one tooth 130 on table 9, and moved a given box 8, under the delivery end of chute 7, that box will remain in that position through a hundred cycles of the main mechanism, if that is the number of teeth on ratchet wheel 132, while pawl 131 is making a complete revolution with wheel 132. After such complete revolution the pawl returns, engages another tooth 130, and turns table 9, far enough to bring another box 8, under chute 7. In this way the product of the machine is distributed, a hundred at a time, in the different boxes 8, 8. When one box is full it may be removed or emptied, and the process repeated.

The pawl 131, is positively forced into action by its rear end riding up on the inclined face of bracket 133, as shown in Fig. 10. When the pawl has passed the bracket, spring 137, retracts the pawl from further engagement with any ratchet tooth 130, so that each partial rotation of table 9, is strictly limited to the space occupied by one tooth 130.

The mode of operation of my invention is such that the wire and tubing are automatically and continuously fed together, welded and cut off in the manner above described. The product forms a very useful support for lamp filaments as the welded joints are mechanically strong and form perfect electrical conductors, while the flattened portion of the tube, sealed into the glass of the stem, is less liable to crack the same than is a solid wire.

Various changes could be made in the details of apparatus herein shown and described without departing from the principle of the invention so long as the general arrangement of parts and sequence of operations are substantially preserved.

Obviously some features of the invention, such as the normally open primary circuit closed only at the moment the welding electrodes bear on the articles to be welded, could be used in lap welding other articles than a wire and tube. The saving of current and danger from short circuits in the primary would be equally advantageous in such other uses. The same is true of the wiping action of the electrodes.

Having described my invention, I claim—

1. In an apparatus for welding a tube to a wire or the like telescoped into it, the combination, with two oppositely disposed electrodes and means for telescoping the tube and wire together between the electrodes, of mechanism for pressing said electrodes upon the interposed, telescoped sections of tube and wire with sufficient force to collapse the walls of the tube upon the wire, and an electric circuit, the terminals of which are connected to said electrodes.

2. A combination such as set forth in claim 1, in which the ends of the electrodes are V shaped, the narrow edges of the electrodes so formed extending crosswise of the tube.

3. In an apparatus for welding the meeting ends of two bodies of metal fed together from opposite directions and cutting off sections immediately adjacent to the weld, the combination of means for intermittently feeding the two bodies together, an electrode normally located under the meeting ends, a vertically movable electrode located above the meeting ends, a discharge chute located in a plane lower than said meeting ends, a circuit for supplying electric current to the electrodes, means for forcing the upper electrode down upon the meeting ends and gripping them between the electrodes, mechanism for subsequently moving the lower electrode away from the meeting and welded ends and moving the mouth of the discharge chute under them, and cutting apparatus for severing the welded ends from the main portions of the two bodies, whereby the welded and severed sections may drop into said chute.

4. In an apparatus for lap welding, two articles together the combination, with two electrodes and an electric circuit in which they are included, of means for pressing said electrodes toward one another upon any articles placed between them to be welded, and means for giving one of said electrodes a lateral movement before the application of such pressure ceases, whereby a wiping action is produced between the parts so brought in contact.

5. The combination of a pair of oppositely reciprocating jaws with faces oppositely grooved on a horizontal line, means for feeding a wire into one end of the guideway formed by said grooved jaws when together, and means for feeding a tube into the other end of said guideway far enough to partly telescope the end of the tube over the wire, an electrode located between the lower parts of the jaws and in contact with said telescoped joint so formed in the guideway, a second electrode normally supported above the jaws, an electric circuit including said electrodes and means for depressing said upper electrode as the jaws are separated by their reciprocating movements, whereby the telescoped sections of wire and tube released by the opening jaws may be compressed between the two electrodes and a weld producing current of elctricity passed through them.

6. A combination such as set forth in claim 5, in which the upper edges of the jaws are beveled off to facilitate the introduction between them of the upper electrode.

7. A combination such as set forth in claim 5, in which the lower electrode is fastened to the face of one jaw and the face of the other is recessed to receive the end of said electrode when the jaws are closed.

8. A combination such as set forth in claim 5 in which the upper edges of both jaws are beveled off to facilitate the introduction between them of the upper electrode and the lower electrode is fastened to the face of one jaw and the face of the other jaw is oppositely recessed to receive the end of said electrode when the jaws are closed.

9. The combination, with apparatus for feeding wire and tubing toward each other, guiding means insuring the telescoping of a section of the wire into the tube, an electrode normally located under such telescoped sections, an electrode supported over such section, and an electric circuit including said electrodes, of a discharge chute, the upper end of which is beside the lower electrode, and mechanism for compressing the telescoped sections between the electrodes and welding them together by the passage of the current through them, then moving the lower electrode out from under the welded sections and simultaneously moving the discharge chute in under them, and finally severing the telescoped and welded sections from the rest of the wire and tubing.

10. The combination, with a machine for telescoping and fastening together sections of wire and tubing, of a rotatable table, a series of boxes carried by said table below the discharge point of the above mentioned machine, and ratchet mechanism operated by said above mentioned machine, at uniform intervals of time to rotate said table each time through an angle sufficient to remove the box then under the discharge point and to place the next box in the same position, whereby the united telescoped wire and tube sections formed by said machine may be uniformly distributed among all the boxes carried by the table.

11. In an apparatus for handling flexible tubing and cutting off short sections thereof, the combination with guiding means for the tubing, and intermittently operating cutting means, of a two-step feeding mechanism for said tubing, laterally operating grippers for grasping the tubing, and a swinging spreader tool adapted to enter the forward cut end of the tubing and open and slightly flare the same, together with connected operating mechanism for the above mentioned elements timed to grip and cut the tubing, free it from the grippers, then feed it forward a slight distance, grip it again in its second position, insert the spreader tool in its forward end, withdraw the spreader, release the grippers and finally feed the tubing forward a second step.

12. In an apparatus having means for intermittently feeding together the ends of two relatively long metal bodies, oppositely disposed electrodes adapted to alternately grasp said meeting ends and release them, apparatus for severing the meeting end-sections from the main portions of the two bodies, and means for sending a welding current of electricity through said electrodes and interposed bodies, the combination with the above recited elements of a discharge chute located in a plane lower than that of the said meeting ends, and mechanism for moving the mouth of said chute under the welded ends before they are cut off from the main bodies, and back again after they are so cut off.

MINER P. WETMORE.

Witnesses:
H. MERLE DARLING,
B. F. O'BRIEN.